Oct. 20, 1942.   C. J. WERNER   2,299,669
STARTING RELAY
Original Filed Nov. 18, 1939
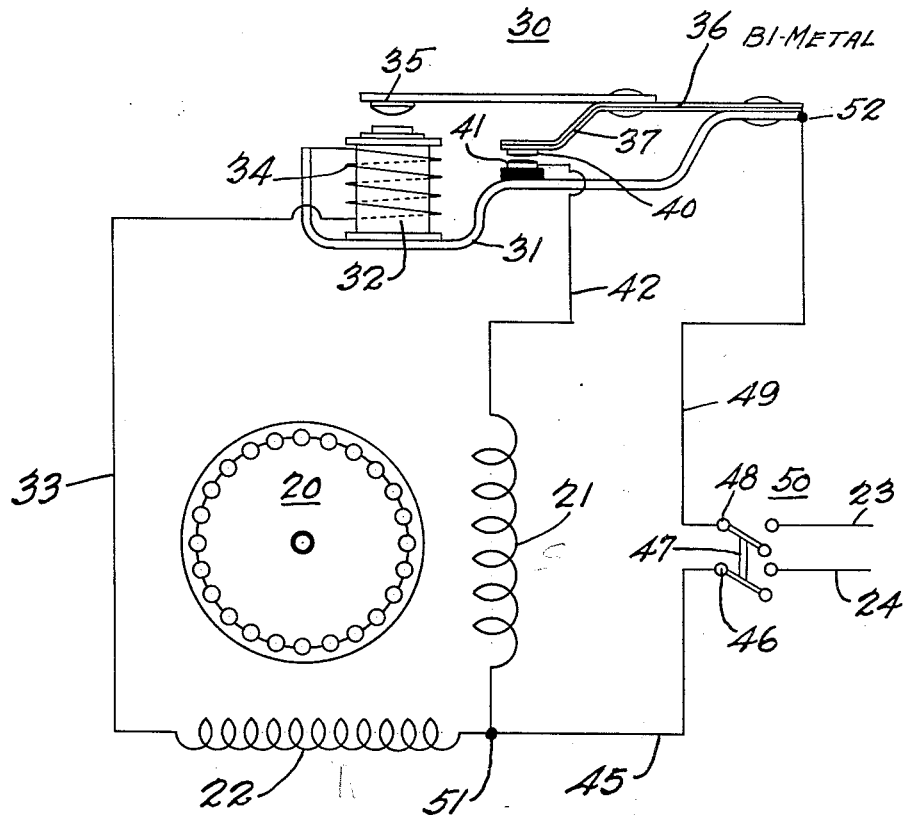
INVENTOR
CALVIN J. WERNER
HIS ATTORNEYS.

Patented Oct. 20, 1942

2,299,669

UNITED STATES PATENT OFFICE 2,299,669

STARTING RELAY

Calvin J. Werner, Dayton, Ohio, assignor to General Motors Corporation, Detroit, Mich., a corporation of Delaware Continuation of application Serial No. 305,109, November 18, 1939. This application June 9, 1941, Serial No. 397,312

5 Claims. (Cl. 172—279)

This invention relates to improvements in electric motors and particularly to protective means provided for said motors.

When connecting a motor to a power line, it is generally the practice to include an automatic circuit breaker in the line which is adapted to break the circuit in response to an abnormal condition such as stalling of the motor or an overload. This protects the motor from possible damage due to such abnormal condition. Usually this circuit breaker is set so as to obtain the maximum safe output from the motor.

The ordinary single phase motor is so designed that the phase or starting winding thereof is more limited in thermal capacity than the main or running winding and therefore the current density is said phase or starting winding is comparatively greater. As a result the phase winding, during the operation of the motor, cannot withstand abuses as readily as the main or running winding and should therefore have separate protecting means.

When the main circuit breaker is set to obtain the maximum safe output of the motor, an excessive current flow under abnormal conditions which could readily be withstood by the main or running winding, might prove damaging to the more limited phase or starting winding before the main circuit breaker became effective to open the line circuit to protect the motor. If, on the other hand the main circuit breaker be set properly to protect the said phase or starting winding under abnormal conditions, then the maximum safe output from the main winding would not be attained.

Therefore, in order to permit setting of the main circuit breaker to obtain the maximum safe output from the motor and still completely protect the more limited phase or starting winding of the motor under all operating conditions, the present invention has for its object the provision of a separate means adapted automatically to open the circuit of said phase or starting winding when the motor has attained proper operating speed or when an excessive current flow for a predetermined interval has traversed said winding and the motor, due to stalling or an overload, will not attain proper operating speed. This separate protecting means for the phase or starting winding of the motor is adapted to become effective before and independently of the main circuit breaker.

This object is attained by providing a protective element to the starting relay for the motor, said relay having an electromagnet coil in series with the main or phase winding and not to be affected by voltage condition but by current flow only. Normally open contacts are provided, a stationary one connected to the phase or starting winding, a movable one carried at the free end of a flexible thermal strip which also provides the sole support for the armature of the relay.

Further objects and advantages of the present invention will be apparent from the following description, reference being had to the accompanying drawing, wherein a preferred embodiment of the invention is clearly shown.

This application is a continuation of application Serial No. 305,109, filed November 18, 1939.

Referring to the drawing in which the single figure diagramatically illustrates a preferred form of the present invention, the numeral 20 designates the electric motor. The phase or starting winding of the motor is designated by the numeral 21 and the main or running winding by the numeral 22. One end of each of these two motor windings 21 and 22 is connected to a motor terminal 51 which is connected by wire 45 to the terminal 46 of the main circuit breaker 50. The power lines 23 and 24 are suitably connected to the circuit breaker 50.

The protective device of the present invention is shown in the form of an electromagnetic relay 30 comprising a frame 31. An electromagnet 32 is carried by the frame, said electromagnet having a winding 34, one end of which is electrically connected to the frame 31, the other end being connected to the end of the main or running winding 22 through the wire 33.

A thermal member in the form of a bimetal strip 36 has its one end attached to the frame 31, the free end of said strip carrying a contact 40 which is normally separated from but adapted to be moved by said strip to engage a cooperating stationary contact 41. This contact 41 is insulatingly carried by the frame and is electrically connected to the end of the phase or starting winding 21 of the motor.

An armature 35 has its one end secured to the bimetal strip 36 so that the free end of the armature lies in spaced alignment with the core of the electromagnet 32. Thus this bimetal strip provides the sole support for the armature 35.

The frame 31 may provide one motor terminal as at 52 which is connected to the terminal 48 of the main circuit breaker 50.

The device operates in the following manner: to start and operate the motor 20, main circuit breaker 50 is actuated to connect the power lines 23 and 24 with the terminals 48 and 46. Circuit breaker 50 is of any standard type which may be set to open automatically in response to certain predetermined conditions in the system. In the present instance it may be set to obtain the maximum safe output from the motor.

Due to the closing of circuit breaker 50, a comparatively heavy surge of current will flow from the power line 23 across the closed circuit breaker 50, through wire 49 to motor terminal 52 and frame 31, magnet winding 34, wire 33, main or running winding 22, motor terminal 51, wire 45 to circuit breaker terminal 46 and back to the other power line 24. This comparatively heavy surge of current through the magnet coil 34 will energize the electromagnet so that it will attract and move its armature 35 downwardly as regards the drawing due to the flexibility of the strip 36 upon which said armature is attached. Such flexing of strip 36 will cause the contact 40, carried thereby, to engage with contact 41, thus completing the following circuit:

From frame 31, already in a closed circuit, through bimetal strip 36, contacts 40 and 41, phase or starting winding 21 to the motor terminal 51 which is connected to the main circuit breaker terminal 46 through wire 45.

The circuits through both running and starting windings 22 and 21 respectively being completed, the motor will tend to start. If and when it attains its proper operating speed, a drop in the current flow through the running winding 22 and its connected magnet winding 34 will obtain, said drop being of such an amount as to reduce the energization of the electromagnet so that it can no longer attract or maintain the armature in its attracted position. Release of the armature and its return to unattracted, normal position will move contact 40 out of engagement with contact 41 and thus break the circuit through the phase or starting winding 21 of the motor. Thus this device is adapted to break the starting winding circuit as soon as the electric motor reaches its predetermined operating speed. If, upon closing of the main circuit breaker 50 and consequent completion of the circuits through both motor windings 21 and 22, the motor does not attain proper operating speed, however, said failure to reach said speed being due to stalling or overload, continued heavy current flow through the bimetal strip 36, across the contacts 40 and 41 and through the phase or starting winding 21 will cause said strip to heat up and due to such heating up, to flex thereby moving the contact 40 from engagement with contact 41 and thus breaking the circuit through the phase or starting winding which, as has been stated, is more limited in thermal capacity than the main or running winding 22 and thereby cannot withstand the effects of a continued heavy current flow as well as said running winding.

Excessive current flow due to abnormal circumstances as mentioned and tending to damage the running winding 22 will be discontinued by the automatic opening of the main circuit breaker 50 at a predetermined time and before such damage may occur. Before this time, however, the electromagnetic relay 30 will have broken the circuit of the starting winding 21 to protect it against damage.

The electromagnet winding 34 is not responsive to voltage conditions and thus if the line voltage as well as the current flow is high, the electromagnet will not release its armature to open contacts 40 and 41, but will effect opening thereof only by the heating up and flexing of the bimetal strip.

From the aforegoing description it may readily be seen that the present invention provides an electric motor with a protective device of simple structure and design, which is adapted to protect the electric motor properly and efficiently without affecting the maximum safe output from the motor.

While the embodiment of the present invention as herein disclosed, constitutes a preferred form, it is to be understood that other forms might be adopted, all coming within the scope of the claims which follow.

What is claimed is as follows:

1. In a device of the character described, the combination with an electric motor having running and starting windings connected together at one end to provide one motor terminal, of a protective relay comprising a frame providing the second motor terminal, an electromagnet on the frame and having a winding connected between the other end of the running winding and frame, normally open, cooperating contacts, one of which is insulatingly carried by the frame and is electrically connected to the other end of the starting winding, a bimetal, flexible strip anchored electrically at one end to the frame and carrying the other contact, and an armature for the relay, solely carried by the bimetal strip.

2. In combination, an electric motor having a starting winding and a running winding connected together at one end and to one side of a source of energy; an electromagnet connected in series with the running winding and with the other side of said energy source; an armature for said electromagnet; a bimetallic member connected to said other side of the source of energy and providing the sole support for said armature; and normally disengaged contacts, one of which is carried by the bimetallic member, the other being connected to one end of the starting winding, said contacts being engaged by mechanical flexing of the bimetallic member by the armature when the electromagnet is energized initially, and being disengaged by thermal flexure of the bimetallic member in response to an abnormal current flow therethrough.

3. In combination, an electric motor having two terminals, a starting winding and a running winding, one end of each being connected to one of said terminals; an electro-magnet connected between the other end of said running winding and the second motor terminal; an armature for said electromagnet; a bimetallic member connected electrically with said second motor terminal and providing the sole support for said armature; and two cooperating contacts, one carried by the bimetallic member, the other being connected to the other end of the starting winding, said contacts being engaged by mechanical flexing of the bimetallic member by the armature when actuated by the electromagnet and being adapted to be separated by thermal flexing of said member in response to the flow of an abnormal current therethrough.

4. An electric motor having main and phase windings joined at one end, said joint being adapted to be connected to a source of electric energy; an electromagnet having a winding connected in series with the main winding and connectible with the other side of said source of energy; a bimetal strip having an anchored end connectible with said other side of the energy source; normally open, cooperating contacts, one on the free end of the bimetal strip, the other having the other end of the phase winding connected thereto; and an armature for the electromagnet, solely, hingedly carried by the bimetal strip.

5. An electric motor having a running winding, one end of which is adapted to be connected to one side of a source of electric energy; an electromagnet having a winding one end of which is connected to the other end of said running winding, the other end of said magnet winding being adapted to be connected to the other side of the source of electric energy; a bimetal strip connected electrically to said other end of the magnet winding; a contact on said strip; a stationary contact adapted to be engaged by the contact on said strip; a starting winding for the motor connected between the stationary contact and the end of the running winding adapted to be connected to the one side of the source of electric energy; and an armature solely supported by said bimetal strip and adapted to be actuated by the electromagnet to actuate the strip to cause contact engagement, said strips being flexed by heat caused by an excessive current flow therethrough, across the contacts and through the starting winding to open said contacts.

CALVIN J. WERNER.